Dec. 12, 1950  H. H. HARR  2,533,930
BEVERAGE PREPARING AND DISPENSING APPARATUS
Filed Jan. 12, 1948
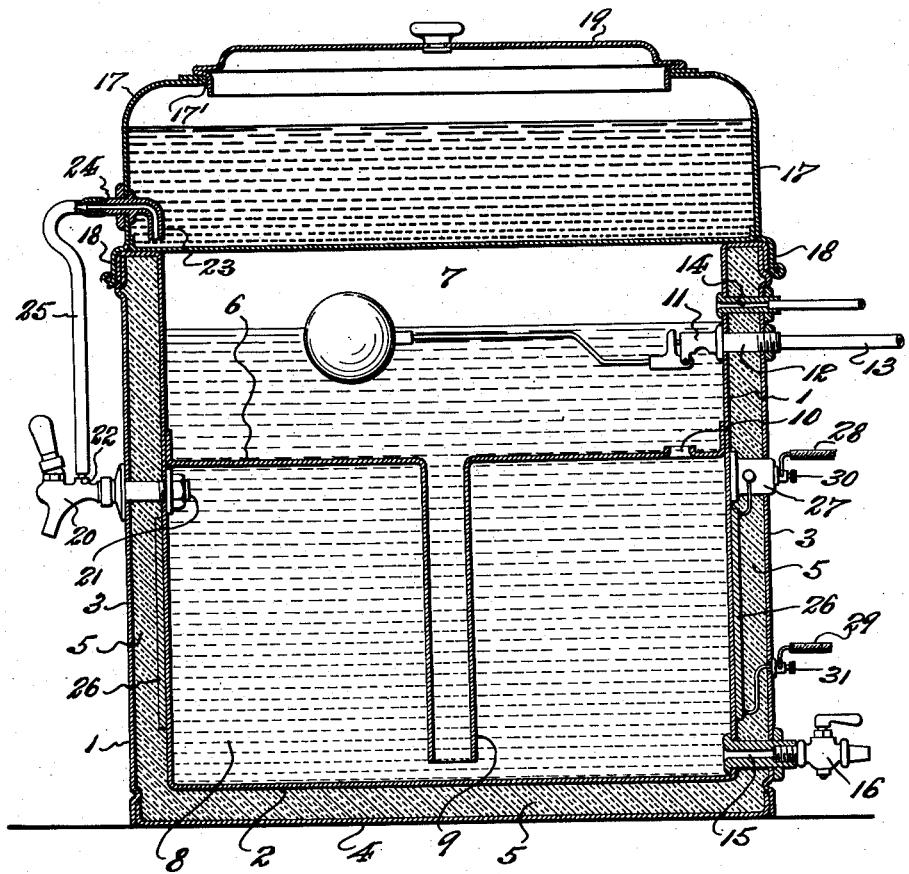
INVENTOR.
Herman H. Harr,
BY George D. Richards,
Attorney Patented Dec. 12, 1950

2,533,930

UNITED STATES PATENT OFFICE 2,533,930

BEVERAGE PREPARING AND DISPENSING APPARATUS

Herman H. Harr, Verona, N. J.

Application January 12, 1948, Serial No. 1,767

4 Claims. (Cl. 225—21)

This invention relates to improvements in beverage preparing and dispensing apparatus, and the invention has for an object to provide a novel apparatus by means of which a plurality of suitably conditioned liquid ingredients may be drawn from separate sources of supply thereof, and mixed together and dispensed, whereby to provide a beverage ready for consumption.

The invention has for another object to provide an apparatus for the purposes stated having a separate supply reservoir for each of two liquid ingredients which, when mixed together, produce a beverage, including mixing and dispensing means common to both reservoirs adapted to draw the respective ingredients from the reservoirs, and one of said reservoirs having means to maintain its contained liquid at a substantially constant head with resultant uniform outflow pressure through the mixing and dispensing means.

The invention has for a further object to provide an apparatus for the purposes stated having a separate supply reservoir for each of two liquid ingredients comprising a lower reservoir for the ingredient used in a major proportion in the beverage mixture, and a superposed upper reservoir for the ingredient used in a minor proportion in the beverage mixture, including means for heating the content of said lower reservoir.

Other objects of this invention, not at this time more particularly enumerated, will be understood from the following detailed description of the same.

An illustrative embodiment of the invention is shown in the accompanying drawing, the figure of which is a vertical cross sectional view through a beverage preparing and dispensing apparatus made according to the invention.

Referring to the drawing, the reference character 1 indicates an upwardly open lower reservoir body of relatively large capacity having a bottom wall 2. Said reservoir body may be of any suitable cross-sectional shape. The reservoir body 1—2 is contained within an external casing 3 having a bottom wall 4. The side and bottom walls of said casing are spaced from the side and bottom walls of the reservoir body, and the intervening space is filled or packed with suitable heat insulation 5.

The interior of said lower reservoir body 1—2 is subdivided, intermediate its top and bottom, by a partition 6, whereby to divide the reservoir body into an upper liquid intake chamber 7 and a lower liquid discharge chamber 8. Provided in connection with said partition 6, so as to depend therefrom into the interior of the lower liquid discharge chamber 8, is a liquid delivery duct 9 which leads from the upper liquid intake chamber 7. The outlet end of said duct 9 terminates short of the bottom of the lower liquid discharge chamber in such manner that liquid of relatively low temperature is admitted into the latter chamber adjacent the bottom thereof. Said partition 6 is preferably additionally provided with a vent or port 10 which provides communication between the upper level or top of the lower liquid discharge chamber 8 and the bottom of the upper liquid intake chamber 7.

Means is provided in connection with the upper liquid intake chamber 7 for controlling admission of replenishing liquid into the reservoir body in such manner as to maintain the liquid content of the latter at substantially constant head and the lower liquid discharge chamber 8 in constant completely filled condition. To this end, a float controlled liquid admission valve 11 is disposed within the upper liquid intake chamber 7 at a suitable level between the top and bottom of the latter. The receiving end 12 of said valve 11 extends through the wall of the encased reservoir body, to project exteriorly from the latter, and connected with said receiving end 12 is a liquid supply pipe or conduit 13 which leads from a suitable source of liquid to be delivered into the reservoir body. Also mounted in connection with and so as to extend through the wall of the encased reservoir body, above the level of the float controlled liquid admission valve 11, is an overflow outlet means 14 which may also serve as a vacuum breaker. In similar manner, a drain means 15 is mounted in connection with and so as to extend through the wall of the encased reservoir body adjacent to the bottom of the lower liquid discharge chamber 8 thereof. Connected with the exterior end of said drain means 15 is a shut-off valve 16, which may be of any suitable kind.

Superposed upon the encased lower reservoir body is an upper reservoir body 17, the latter being provided at its bottom end with a dependent annular skirt or coupling flange 18 which is adapted to telescope over the upper end of said encased lower reservoir body, whereby to removably mount the upper reservoir body 17 in supported axially aligned relation to said encased lower reservoir body. The upper reservoir body 17 is provided in its top with a filling opening 17', which is adapted to be normally closed by a removable cover member 19.

A mixing and dispensing means common to both the lower and upper reservoirs is provided, the same comprising a mixing and dispensing faucet 20 having an intake end 21 mounted in and through the wall of the encased lower reservoir so as to communicate with the lower liquid discharge chamber 8 of the latter at a point adjacent to the top level of said chamber. Said faucet 20 is provided with a second intake 22 adapted to be connected in communication with the interior of the upper reservoir body 17. Said faucet is preferably of the type and kind disclosed in my prior United States Letters Patent 2,416,581 and 2,416,582.

The communicating connection between the faucet 20 and the uper reservoir body 17 is preferably of siphonic character, and comprises a siphon intake arm 23 terminating at its upper end in an extension 24 adapted to be affixed to the wall of said upper reservoir body 17, so as to extend therethrough for outward projection therefrom. The siphon intake arm 23 depends within the interior of the upper reservoir body 17, so that its intake end is spaced adjacent to the bottom of the latter. Coupled to the outwardly projecting end of said extension 24 of the siphon intake arm is the upper end of a flexible hose 25, the lower end of which is coupled in communication with the second intake 22 of the mixing and dispensing faucet 20. Said hose 25 constitutes the siphon outlet or discharge arm.

The lower and upper reservoirs are adapted to respectively contain the respective liquid ingredients which, when mixed together, produce the beverage desired to be dispensed. The lower reservoir is adapted to contain the liquid ingredient which is to be used in a major proportion in the ultimate beverage mixture to be dispensed, while the upper reservoir is adapted to contain the liquid ingredient which is to be used in minor proportion in said ultimate beverage. Any suitable major or base liquid may be used for mixture with any suitable minor or flavoring liquid, and when the faucet 20 is opened, the two liquids in suitable relative proportions meet within the faucet so as to intermingle and produce the beverage mixture which is thereupon discharged from the faucet spout. Cold liquids may be thus mixed and dispensed to provide a cold beverage.

The apparatus, however, is designed, more particularly, to efficiently prepare and dispense a hot beverage mixture, and to this end means is provided for applying heat to the lower liquid discharge chamber 8 of the lower reservoir, whereby to heat the body of major or base liquid ingredient contained therein to a desired temperature degree. For this purpose, an electrical heater element 26, of any suitable type, is mounted externally of the reservoir body 1 in contact with the wall thereof which is contiguous to the lower liquid discharge chamber 8 of said reservoir body, and intermediate said wall and the surrounding insulation material 5. Cooperative with said heater element 26 is a suitable thermostatic switch element 27 for automatically governing the operation of the heater element within desired temperature limits. Said thermostatic switch element is connected in series with the heater element in an electrical service circuit which includes the ingoing and outgoing circuit wires 28 and 29, the latter being respectively connected to external binding post terminals 30 and 31 with which the apparatus is provided.

The apparatus of this invention is especially well adapted for the preparation of a hot beverage such e. g. as hot chocolate formed by mixing with hot water, as the major liquid ingredient, liquid chocolate or chocolate syrup, as the minor liquid ingredient. In such use, the lower reservoir is supplied with a content of water, and the upper reservoir with a content of liquid chocolate or chocolate syrup. That portion of the water contained in the lower discharge chamber 8 of the lower reservoir is heated to a desired temperature by the heating element 26. Some heat thus generated within the lower reservoir is transmitted by conduction and radiation to the upper reservoir, and this is very desirable when utilizing a minor liquid ingredient such as liquid chocolate or chocolate syrup since sufficient heat is applied to the latter to assure maintenance of the same in readily flowable condition, as well as to prevent clouding, blooming or like undesirable effects.

In the operation of the apparatus, any water withdrawn from the discharge chamber 8 of the lower reservoir, by operation of the mixing and dispensing faucet, is simultaneously replaced from the intake chamber 7 through the intercommunicating duct 9, and is delivered into the bottom level of said discharge chamber 8, thus being prevented from effecting any substantial temperature reduction upon the water in the upper level of the discharge chamber 8 with which the dispensing faucet communicates. Water transferred from the intake chamber 7 to the discharge chamber 8 is immediately replaced in the former chamber by operation of the float controlled admission valve 11 through which water is supplied from an outside source, such e. g. as from a city main or other similar source. By reason of the replacement of water losses through such operation of the float controlled admission valve 11, the head of the body of water within the lower reservoir is maintained constant, with the result that outflow pressure through the mixing and dispensing faucet, when the latter is open, is held uniform at all times. This is very important, since it assures uniform volume and rate of flow of water to and through the mixing and dispensing faucet, which consequently assures uniform inflow into the faucet, in desired predetermined relative proportion to the water flow through the latter, of the liquid chocolate or chocolate syrup which is delivered to the faucet through the siphonic discharge connection which leads thereto from the upper reservoir.

While I have described the use of the apparatus for preparing and dispensing a hot beverage such as hot chocolate, it will be obvious that the apparatus may be used equally well for preparing and dispensing many other kinds of hot beverages. For example, if it is desired to dispense hot black coffee, liquid coffee essence can be served from the upper reservoir as a minor liquid ingredient, and hot water from the lower reservoir as a base or major liquid ingredient; or, if it is desired to dispense coffee with an admixture of milk or cream, the milk or cream can be served from the upper reservoir as a minor liquid ingredient, and hot brewed coffee from the lower reservoir as a base or major liquid ingredient.

Having now described my invention, I claim:
1. Beverage preparing and dispensing apparatus comprising two reservoirs adapted to respectively contain respective liquid ingredients which, when mixed together, provide a beverage, a parti- tion dividing one of said reservoirs into an upper intake chamber and a lower discharge chamber, a duct adapted to deliver liquid from said intake chamber to the lower level of said discharge chamber, a mixing and dispensing faucet having separate intakes in communication respectively with the upper level of said discharge chamber of the two-chamber reservoir and with the other reservoir, and heating means for said discharge chamber.

2. Beverage preparing and dispensing apparatus as defined in claim 1, wherein the intake chamber of the two-chamber reservoir is upwardly open and has the other reservoir superposed thereupon whereby heat may be transmitted by conduction and radiation from the liquid in the discharge chamber of the two-chamber reservoir through the contents of the intake chamber thereof to the liquid in the other reservoir.

3. A beverage preparing and dispensing apparatus as defined in claim 1, wherein the two-chamber reservoir is disposed beneath the said other reservoir and wherein communication between the said other reservoir and the corresponding intake of the mixing and dispensing faucet is constituted by a siphon tube adapted to supply the liquid ingredient from said other reservoir in predetermined proportion to the liquid drawn off from the discharge chamber of said two-chamber reservoir.

4. A beverage preparing and dispensing apparatus as defined in claim 1, wherein the intake chamber of the two-chamber reservoir is upwardly open and has the other reservoir superposed thereupon whereby heat may be transmitted by conduction and radiation from the liquid in the discharge chamber of the two-chamber reservoir through the contents of the intake chamber thereof to the liquid in the said other superposed reservoir, and which includes a float-controlled admission valve disposed to deliver a liquid ingredient of the beverage to the intake chamber of the two-chamber reservoir and to maintain the same at a substantially constant level below the top of said intake chamber whereby to provide a heat radiation air space between the liquid contents of said chamber and the said other superposed reservoir.

HERMAN H. HARR.

REFERENCES CITED

The following references are of record in the file of this patent:

UNITED STATES PATENTS

| Number | Name | Date |
| --- | --- | --- |
| 940,367 | Schlueter | Nov. 16, 1909 |
| 2,023,373 | Notar et al. | Dec. 3, 1935 |
| 2,380,884 | Von Stoeser et al. | July 31, 1945 |
| 2,413,736 | Thompson | Jan. 7, 1947 |